US010526939B2

(12) United States Patent
Gopalan et al.

(10) Patent No.: US 10,526,939 B2
(45) Date of Patent: Jan. 7, 2020

(54) BI-DIRECTIONAL FLUIDIC PCV VALVE ASSEMBLY AND SYSTEM

(71) Applicant: DLHBOWLES, INC., Canton, OH (US)

(72) Inventors: Shridhar Gopalan, Westminster, MD (US); Corey Zamenski, Essex, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 15/952,755

(22) Filed: Apr. 13, 2018

(65) Prior Publication Data

US 2018/0274409 A1 Sep. 27, 2018

Related U.S. Application Data

(63) Continuation-in-part of application No. 15/933,773, filed on Mar. 23, 2018.

(60) Provisional application No. 62/485,653, filed on Apr. 14, 2017, provisional application No. 62/475,354, filed on Mar. 23, 2017.

(51) Int. Cl.

*F01M 13/00* (2006.01)
*F16K 17/18* (2006.01)
*F01M 13/02* (2006.01)

(52) U.S. Cl.

CPC ...... *F01M 13/0011* (2013.01); *F01M 13/028* (2013.01); *F16K 17/18* (2013.01)

(58) Field of Classification Search

CPC ............ F01M 13/0011; F01M 13/028; F01M 13/023; F01M 13/00; F01M 2013/0083; F15B 2211/329

See application file for complete search history.

(56) References Cited

U.S. PATENT DOCUMENTS

| | | | |
|---|---|---|---|
| 3,783,904 | A | 1/1974 | Takahashi |
| 4,131,134 | A | 12/1978 | Lindberg |
| 4,270,508 | A | 6/1981 | Lindberg |
| 5,027,784 | A | 7/1991 | Osawa |
| 8,070,424 | B2 | 12/2011 | Priestman |

(Continued)

FOREIGN PATENT DOCUMENTS

| | | |
|---|---|---|
| EP | 2098937 | 9/2009 |
| GB | 1177521 | 1/1970 |

OTHER PUBLICATIONS

European Patent Office; International Search Report and Written Opinion for International Application No. PCT/US2018/023949; dated Jun. 25, 2018.

(Continued)

*Primary Examiner* — Long T Tran

(74) *Attorney, Agent, or Firm* — McDonald Hopkins LLC

(57) ABSTRACT

Provided is a bi-directional PCV valve assembly, system and method. The bi-directional PCV valve may include a fluidic geometry that allows for a flow of fluid a high flow rate in one direction, forward flow, and a low flow rate in the opposite direction, reverse flow. The reverse flow includes a swirling flow that increases the pressure drop and reduces the flow rate to a third of the flow rate of the forward flow. The disclosed assembly produces a strong swirling flow (vortex) in the reverse direction and an efficient (low pressure drop) flow in the forward direction.

20 Claims, 12 Drawing Sheets

100
134
132
124
115
130
142
140
112
160
110
120
122
150

(56) References Cited

U.S. PATENT DOCUMENTS

| | | | | |
|---|---|---|---|---|
| 2009/0223498 | A1* | 9/2009 | Shieh | F02M 25/06 123/574 |
| 2014/0034031 | A1* | 2/2014 | Wagner | F01M 13/023 123/574 |
| 2014/0069399 | A1* | 3/2014 | Eckard | F01M 13/0011 123/574 |
| 2016/0312686 | A1* | 10/2016 | Christian | F01M 13/04 |
| 2017/0234178 | A1* | 8/2017 | Mosher | G05D 7/0133 123/574 |
| 2017/0314432 | A1* | 11/2017 | Dwivedi | F01M 13/0011 |

OTHER PUBLICATIONS

European Patent Office; International Search Report and Written Opinion for International Application No. PCT/US2018/027510; dated Jun. 14, 2018.

* cited by examiner

100

112

114

BI-DIRECTIONAL FLUIDIC PCV VALVE ASSEMBLY AND SYSTEM

CROSS-REFERENCE TO RELATED APPLICATIONS

This application claims priority to Provisional Patent Application No. 62/485,653 entitled "FLUIDIC EQUIPPED BI-DIRECTIONAL PCV GAS FLOW CONTROLLER AND CONDITION RESPONSIVE METHOD TWIN VORTEX GENERATING SYSTEM AND METHOD FOR CONTROLLING GAS FLOW IN AN INTERNAL COMBUSTION ENGINE CRANKCASE" filed on Apr. 14, 2017. This application is a continuation-in-part of U.S. patent application Ser. No. 15/933,773 entitled "FLUIDIC PVC VALVE ASSEMBLY AND SYSTEM" filed on Mar. 23, 2018 which claims priority to Provisional Patent Application No. 62/475,354 entitled "FLUIDIC EQUIPPED PCV GAS FLOW CONTROLLER AND CONDITION RESPONSIVE METHOD FOR CONTROLLING CRANKCASE GAS FLOW IN AN INTERNAL COMBUSTION ENGINE CRANKCASE" filed on Mar. 23, 2017, each of which are hereby incorporated by reference in their entireties.

FIELD OF INVENTION

The present invention relates to internal combustion engine crankcase gas flow rate control assembly and system and, more particularly, to a positive crankcase ventilation ("PCV") gas flow rate control assembly, system and components therefor.

BACKGROUND

The present invention relates to an internal combustion engine crankcase gas flow rate control assembly and system and, more particularly, to a positive crankcase ventilation ("PCV") gas flow rate control assembly and system for controlling the recirculation of gas discharge from an engine in accordance with engine operating conditions and also in accordance with flow rate adjustments made to the gas flow rate control system.

A PCV system provides a controlled mechanism for gases to escape the crankcase of an internal combustion engine. The heart of this system is the PCV valve, typically a single channel variable-restriction valve that can react to changing pressure values and intermittently vary flow rates while allowing the passage of the gases to their intended destination. In most modern vehicles the intended destination is the engine's intake stream.

Internal combustion inevitably involves a small but continual amount of blow-by gases, which will occur when some of the gases from the combustion leak past the piston rings to end up inside the crankcase. The gases could be vented through a simple hole or tube directly to the atmosphere, or they could "find their own way out" past baffles or past the oil seals of shafts or the gaskets of bolted joints. This is not a problem from a mechanical engineering viewpoint alone; but from other viewpoints, such as cleanliness for the user and environmental protection, such simple ventilation methods are not enough; escape of oil and gases must be prevented via a closed system that routes the escaping gases to the engine's intake stream and allows fresh air to be introduced into the crankcase for better and more efficient combustion.

From late in the 19th century through the early 20th century, blow-by gases were allowed to find their own way out past seals and gaskets in automotive vehicles. It was considered normal for oil to be found both inside and outside an engine, and for oil to drip to the ground in small but constant amounts. Bearing and valve designs generally made little to no provision for keeping oil or waste gases contained. In internal combustion engines, the hydrocarbon-rich blow-by gases would diffuse through the oil in the seals and gaskets into the atmosphere. Engines with high amounts of blow-by would leak profusely.

Until the early 1960s, automotive engines vented combustion gases directly to the atmosphere through a simple vent tube. Frequently, this consisted of a pipe (the 'road draft tube') that extended out from the crankcase down to the bottom of the engine compartment. The bottom of the pipe was open to the atmosphere, and was placed such that when the car was in motion a slight vacuum was obtained, helping to extract combustion gases as they collected in the crankcase. Oil mist would also be discharged, resulting in an oily film being deposited in the middle of each travel lane on heavily-used roads. The system was not "positive", as gases could travel both ways, or not move at all, depending on conditions.

Environmental concerns lead to the development of controlling combustion gases in an engine. The PCV valve and system operates as a variable and calibrated air leak whereby the engine returns its crankcase combustion gases. Instead of the gases being vented to the atmosphere, these gases are fed back into the intake manifold, re-entering the combustion chamber as part of a fresh charge of air and fuel. All the air collected by the air cleaner (and metered by the mass flow sensor, on a fuel injected engine) goes through the intake manifold. The PCV system diverts a small percentage of this air via the breather to the crankcase before allowing it to be drawn back into the intake tract again. The positive crankcase ventilation system is an "open system" in that fresh exterior air is continuously used to flush contaminants from the crankcase and draw them into the combustion chamber.

FIGS. 1A-1D illustrate a typical PCV system's use in an internal combustion engine. As illustrated in FIG. 1A and as described in U.S. Pat. No. 5,027,784, an internal combustion engine includes a cylinder head 1, a cylinder head cover 2, a cylinder block 3, and an oil pan 4. A typical prior art PCV system includes a PCV "vacuum" connection line 7 connecting the cylinder head cover 2 to a portion of an intake passage 8 of the internal combustion engine at a location downstream of a throttle valve 9. A PCV valve 6 is provided for controlling flow of blow-by gas in the PCV connection line 7. A baffle plate 12 provided in the cylinder head cover 2 acts as a primary trap for oil mist contained in the blow-by gas. A trap chamber 5 on the downstream or vacuum side of the PCV valve 6 serves as a secondary trap for oil mist in the blow-by gas. Oil mist trapped in the trap chamber 5 collects on a bottom wall 5' of the trap chamber 5.

During engine operation, blow-by gas which has leaked past a piston into a crankcase of the cylinder block 3, flows into the cylinder head cover 2 through a path formed in the cylinder block 3 and the cylinder head 1. The blow-by gas, controlled by the PCV valve 6, then flows through the PCV connection line 7 into the intake passage 8 of the engine to be burned in the combustion chamber.

The PCV system of FIG. 1A relies on the fact that, while the engine is running under light load and moderate throttle opening, the intake manifold's pressure is always less than crankcase pressure. The lower pressure of the intake manifold draws gases towards it, pulling air from the breather through the crankcase where the air is diluted and mixed with combustion gases through the PCV valve, and returned to the intake manifold. Typical PCV system PCV connection tubes (e.g., 7) connect the crankcase to a clean source of fresh air, namely, the air cleaner body. Usually, clean air from the air cleaner flows into this tube and into the engine after passing through a screen, baffle, or other simple system to arrest a flame front in order to prevent a potentially explosive atmosphere within the engine crankcase from being ignited from a backfire into the intake manifold. Once inside the engine, the air circulates around the interior of the engine, picking up and clearing away combustion byproduct gases, including any substantive amounts of water vapor which includes dissolved chemical combustion byproducts. The combined gases then exit through another simple baffle, screen, or mesh to trap oil droplets before being drawn out through the PCV valve 6 and into the intake manifold 8.

The typical PCV valve 6 is a simple mechanism with a few moving parts, as illustrated in FIGS. 1B, 1C, and 1D, but it performs a somewhat complicated gas flow control function. In some prior art PCV valve assemblies, an internal restrictor 13 (generally a piston or pintle) is held in "normal" (engine off, zero vacuum) position with a light spring 14, exposing the full size of the PCV opening to the intake manifold. With the engine running, the pintle is drawn towards the manifold side in the PCV valve by manifold vacuum, restricting the opening proportionate to the level of engine vacuum vs. spring force. At idle, the intake manifold vacuum is near maximum (as best seen in FIG. 1B). It is at this time the least amount of blow-by is actually occurring, so the PCV valve provides a large amount of (but not complete) restriction. As engine load increases, vacuum on the valve decreases proportionally and blow by increases proportionally. With a lower level of vacuum, the spring 14 returns the pintle 13 to the "open" position to allow more air flow. At full throttle (see, e.g., FIG. 1C), vacuum is much reduced, down to between 1.5 and 3 inches of Hg. At this point the PCV valve is essentially open and flowing, and most combustion gases escape via the "breather tube" where they are then drawn into the engine's intake manifold. Should the intake manifold's pressure be higher than that of the crankcase (which can happen in a turbocharged engine, or under certain conditions of use, such as an intake backfire, see, e.g., FIG. 1D), the PCV valve closes to prevent backflow into the crankcase.

In prior art PCV systems, the parts of the PCV system should be kept clean and open, otherwise air flow may be insufficient. A malfunctioning PCV valve may eventually damage an engine. Typical maintenance schedules for gasoline engines include PCV valve replacement whenever the air filter or spark plugs are replaced, because anything with moving parts inside may eventually fail.

Most gasoline powered internal combustion engines utilize PCV valves. The basic design of the PCV valve (as illustrated in FIGS. 1A-1D) has not changed much since its first introduction in passenger vehicles. The operating characteristics that define a PCV valve are: idle flow rate; cruise flow rate; transition vacuum level, and backfire-backflow prevention. Idle flow rate is the determination of the quantity of gas flowing through the PCV valve during high vacuum conditions existing when an engine is idling (See FIG. 1B). Cruise flow rate is the determination of the quantity of gas flowing through the PCV valve during low vacuum conditions when the engine is operating at higher rpm's during, for example, vehicle acceleration (See FIG. 1C). Transition vacuum level is the vacuum level at which the PCV valve switches from a low to a high flow rate, and backfire-backflow prevention is required in those rare situations where manifold pressure exceeds crankcase pressure (See FIG. 1D). A properly operating PCV valve should exhibit a decreasing flow curve with increasing vacuum, but a malfunctioning PCV valve can result in crankcase over pressure, oil sludge, oil leaks, poor fuel economy, rough idle and other problems.

In order to achieve the desired decreasing flow curve, most PCV valves employ a spring-pintle design as shown in FIGS. 1B-1D, and as a result, in most PCV valve designs, the flow passage is a variable annular area, which varies as the pintle moves linearly. The open lumen area defined by this annular opening can be as small as 0.25-0.3 mm and, in operation, the PCV valve assembly is prone to blockage from clogging. In addition, typical PCV valves such as those shown in FIGS. 1A-1D which have a spring/pintle assembly are also prone to sticking in one position or another.

Certain kinds of engines present additional problems. For example, engines with superchargers or turbochargers require intake manifold structures which are more complicated. As illustrated in FIG. 1A, the typical PCV design includes a tube from upstream of the throttle body to the crankcase, and a tube from the crankcase to the intake manifold that includes a PCV valve. The PCV system is designed to work on intake manifold vacuum, which is available in most operating conditions of a Naturally Aspirated (NA) engine. Automotive manufacturers are beginning to transition from larger NA engines to smaller Turbo Charged engines for improved fuel efficiency. The switch to turbo engines has created a need for different PCV system configurations.

Prior art PCV systems for use with Turbo Charge engines typically include a second PCV assembly which includes a flapper valve over a larger orifice for the boosted flow and a small orifice for the non-boosted flow, but problematic flapper valve members can get stuck (e.g., in a closed state), and, like typical PCV valves such as those shown in FIGS. 1B-1D, run a risk of clogging.

It is an object of the present invention to overcome these problems and provide an improved, more durable and trouble-free PCV valve for use in an improved PCV system which will minimize the likelihood of sticking or clogging problems and enhance long term engine performance.

SUMMARY

Accordingly, it is an object of the present disclosure to overcome the above mentioned difficulties by providing a reliable effective PCV system including an additional PCV valve with fluid communications or tube(s) from upstream of the throttle body (or turbo inlet) to the crankcase (such as a PCV system component may be considered a bi-directional PCV valve) and preferably includes no moving parts. The additional bi-directional PCV valve may be used in addition to a traditional PCV valve to provide an improved PCV system. The purpose of the bi-directional PCV valve assembly is to allow a high flow rate when gas/liquid is flowing from the crankcase (venting condition), and to reduce the flow rate when the gas/liquid is flowing toward the crankcase (make-up air condition).

A bidirectional PCV valve member or flow controller may include a fluidic geometry having passages, channels or ports dimensioned to reliably and precisely produce different flow rates in the forward flow direction and reverse flow direction, where flow rates in the two opposing glow direction may be controlled to provide a selected ratio (e.g., three to one) meaning flow in the first or forward direction may be about three times that of the flow in the opposite, second or reverse direction. The flow of fluid (gas or liquid) may function differently in distinct states corresponding to the forward flow and reverse flow. In a first "forward flow" state, the flow may be directly (radially) from a central lumen (now as an inlet) to first and second opposing tangential power nozzles and then to corresponding lumens (now as outlets). In a second "reverse flow" state, the flow follows a spiral path from first and second opposing tangential power nozzles and the corresponding lumens (now as inlets) spiraling within the interaction chamber and then exhausting from the central lumen (now as an outlet).

As mentioned above, the prior art PCV system operation has only been achieved with use of condition responsive moving parts (e.g., the pintle-spring assembly illustrated in FIGS. 1B-1D). In accordance with the structure and method of the present disclosure, excellent PCV performance is provided with no moving parts to wear out or fail.

The bi-directional fluidic-equipped PCV valve assembly or flow controller and system includes a fluidic geometry defined to allow for the flow of fluid therein in different modes of operation. In a first or boosted mode, fluid flows in a first or forward direction and in a non-boosted mode, fluid flows in a second or reverse direction, as dictated during the operation of the engine. The first is a radial mode or high flow mode. The second is a tangential mode or a low flow mode. At low or non-boosted pressures, the bi-directional fluidic equipped PCV valve assembly 100 may be tuned to operate in a swirling or tangential mode to produce low flow rates relative to the operation in the boosted mode. Low flow rates may be due to higher flow resistance. As boost increases, the fluidic equipped bi-directional PCV valve assembly 100 may automatically switch modes. The threshold value of pressure and/or vacuum to allow for the switch between modes may be adjusted to different threshold values.

The system and method of the present disclosure may be used with a turbo charged engine and may provide an improve PCV system, which includes the addition of a bi-directional PCV valve assembly. The bi-directional PCV valve may be designed to have a high flow rate in one direction (forward flow) and a low flow rate in the opposite direction (reverse flow). The assembly and method of the present disclosure may omit use for a flapper valve which can become stuck or clogged and replaces the generally small orifice with a larger orifice to reduce the risk of clogging. Swirling flow in the reverse direction increases the pressure drop and the flow rate relative to the forward flow wherein the flow rate may be about a third of the forward flow. The system of the present disclosure may produce a strong swirling flow or vortex in the reverse direction and efficient (low pressure drop) flow in the forward direction. The fluidic equipped bi-directional PCV valve assembly may provide superior performance with no moving parts to wear out or fail.

In one embodiment, provided is a bi-directional PCV valve assembly comprising a body defining a fluidic geometry. The fluid geometry comprising a first transfer chamber in communication with a first power nozzle. A second transfer chamber may be in communication with a second power nozzle. A vortex chamber having a perimeter wherein the first and second power nozzles intersect along the perimeter of the vortex chamber, said vortex chamber may be in communication with an outlet. The PCV valve assembly may be configured to automatically switch between a low flow mode and a high flow mode based of fluid or gas flow through the fluidic geometry. In high flow mode, fluid or gas enters the outlet and traverses through the vortex chamber towards the first transfer chamber and second transfer chamber such that the fluid or gas is in a boosted condition. The assembly may be tunable to automatically switch between the low flow mode and the high flow mode based on vacuum pressure at the outlet. In low flow mode, fluid or gas enters the first transfer chamber and traverses through the first power nozzle into the vortex chamber, fluid or gas enters the second transfer chamber and traverses through the second power nozzle into the vortex chamber, wherein fluid or gas creates a swirl within the vortex chamber and flows towards the outlet. The flow traverses through the first and second power nozzles and aligns along an outer wall of the vortex chamber before forming a swirl flow within the vortex chamber. The first power nozzle includes a shape that generally converges from the first transfer region towards the vortex chamber and the second power nozzle includes a shape that generally converges from the second transfer region towards the vortex chamber. The first transfer chamber and the second transfer chamber may have a generally bulbous shape. The body includes a first side and an opposite second side wherein the vortex chamber may be formed in the first side of the body and an outlet region may be formed in the second side of the body. The high flow mode includes a flow rate that is about three times the flow rate of the low flow mode.

In another embodiment, provided is a fluidic-equipped bi-directional PCV valve flow controller comprising a housing defining a cavity in communication with a plurality of lumens. A body positioned within said cavity, said body defining a fluidic geometry. The fluidic geometry comprising a first transfer chamber in communication with a first power nozzle and a second transfer chamber in communication with a second power nozzle. A vortex chamber having a perimeter wherein the first and second power nozzles intersect along the perimeter of the vortex chamber, said vortex chamber in communication with an outlet. The controller may be configured to automatically switch between a low flow mode and a high flow mode based on the direction of fluid or gas flow through the fluidic geometry.

In yet another embodiment, provided is a method for providing enhanced PCV performance in a system comprising the method steps of (a) providing a PCV valve assembly with an inlet configured for fluid communication with an engine's crankcase interior volume and an outlet configured for fluid communication with an air intake tube; (b) providing, in that PCV valve assembly, a housing defining a cavity, a body positioned within said cavity, said body defining a fluidic geometry comprising: a first transfer chamber in communication with a first power nozzle; a second transfer chamber in communication with a second power nozzle; a vortex chamber having a perimeter wherein the first and second power nozzles intersect along the perimeter of the vortex chamber, said vortex chamber in communication with an outlet; (c) introducing a flow of fluid or gas at the inlet to traverse through said PCV valve assembly to said outlet. The method further comprises modifying a direction of fluid flow at the inlet and switching characteristics of the flow of fluid or gas between a high flow mode and a low flow mode.

BRIEF DESCRIPTION OF THE DRAWINGS

Operation of the present disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the present disclosure as if fully rewritten herein. In the drawings.

DETAILED DESCRIPTION

Figure 1A:
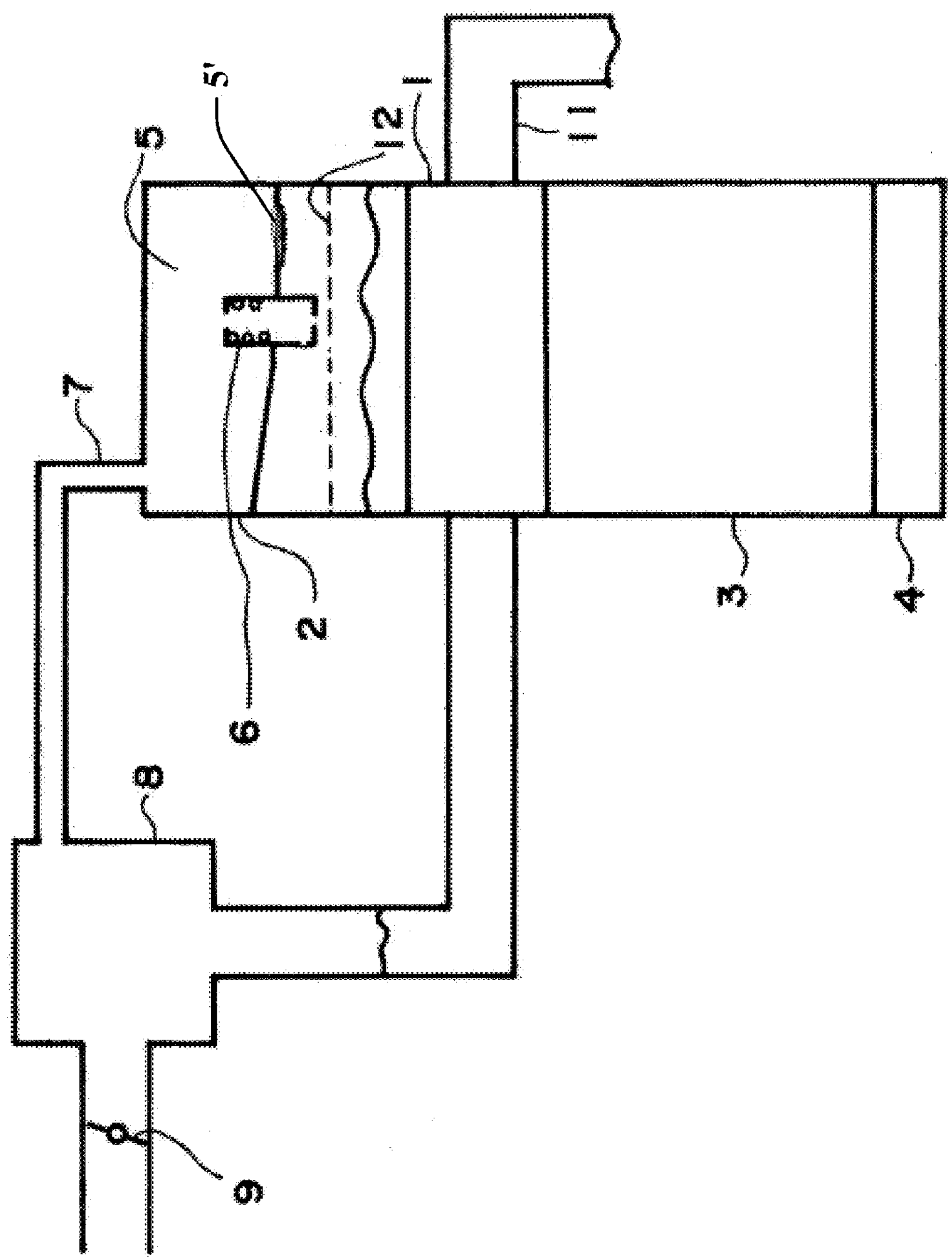
FIG. 1A is a schematic elevational view of a PCV system in accordance with the prior art.
Figures 1B, 1C, 1D:
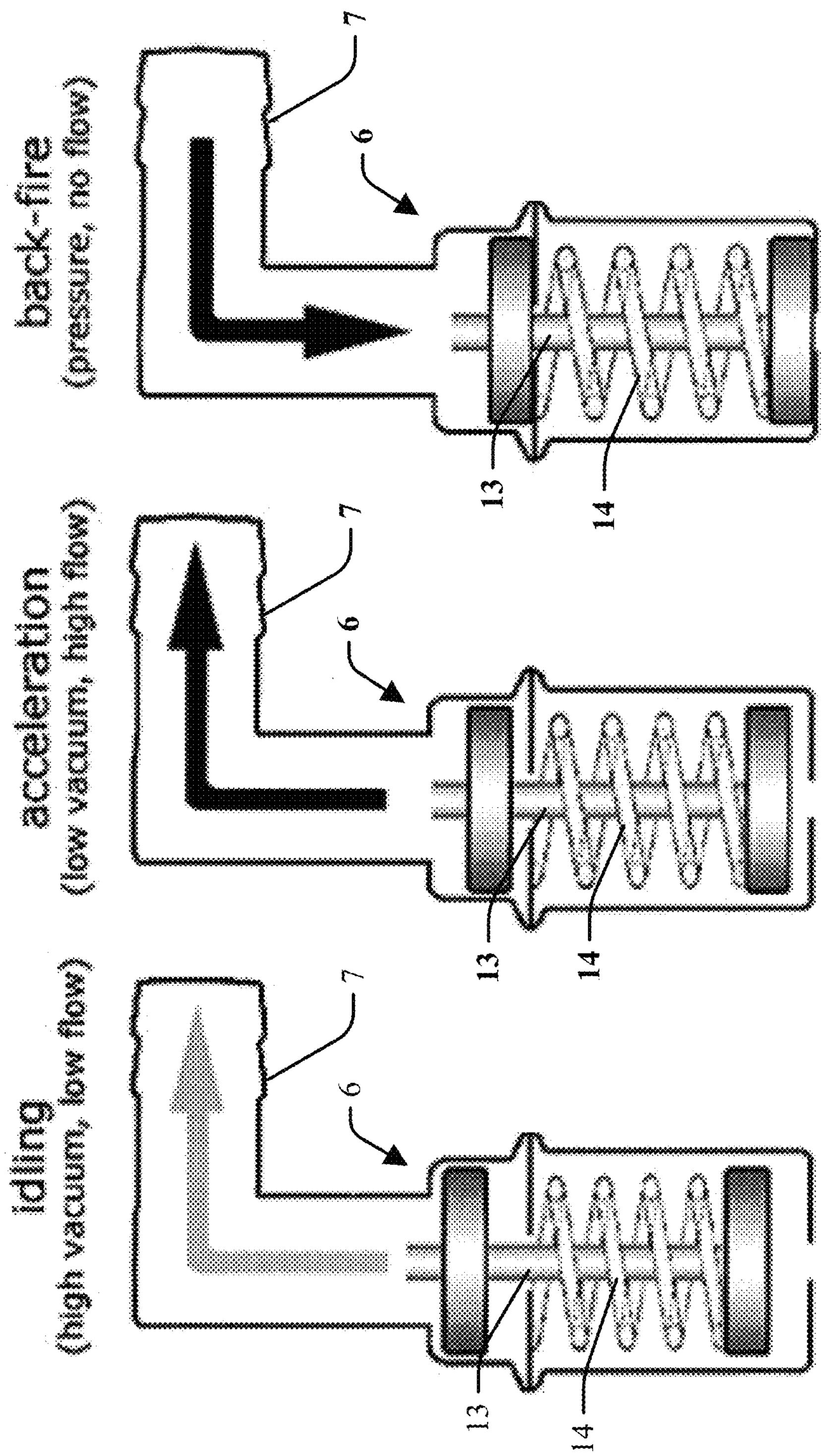
FIG. 1B is a schematic cross-sectional view of a prior art PCV system in an acceleration state whereby an engine returns its crankcase combustion gases to an inlet manifold via a PCV valve, in accordance with the prior art.
FIG. 1C is a schematic cross-sectional view of a prior art PCV system in an idling state whereby an engine returns its crankcase combustion gases to an inlet manifold via a PCV valve, in accordance with the prior art.
FIG. 1D is a schematic cross-sectional view of a prior art PCV system in a back-fire state whereby an engine returns its crankcase combustion gases to an inlet manifold via a PCV valve, in accordance with the prior art.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

Referring to FIGS. 2-9, the bi-directional fluidic PCV assembly 100 includes a body 110 including a first side 112 and an opposite second side 114 and having a fluidic geometry 115 defined therein. The fluidic geometry 115 may include a first power nozzle 120 and a second power nozzle 130 which are in fluid communication with a vortex chamber 140 that is preferably defined around a central transverse outlet axis 150 and exhausts axially through an outlet aperture or lumen 160. These features may be defined within the first side 112 of the body 110 of the PCV assembly 100.

Figure 2:
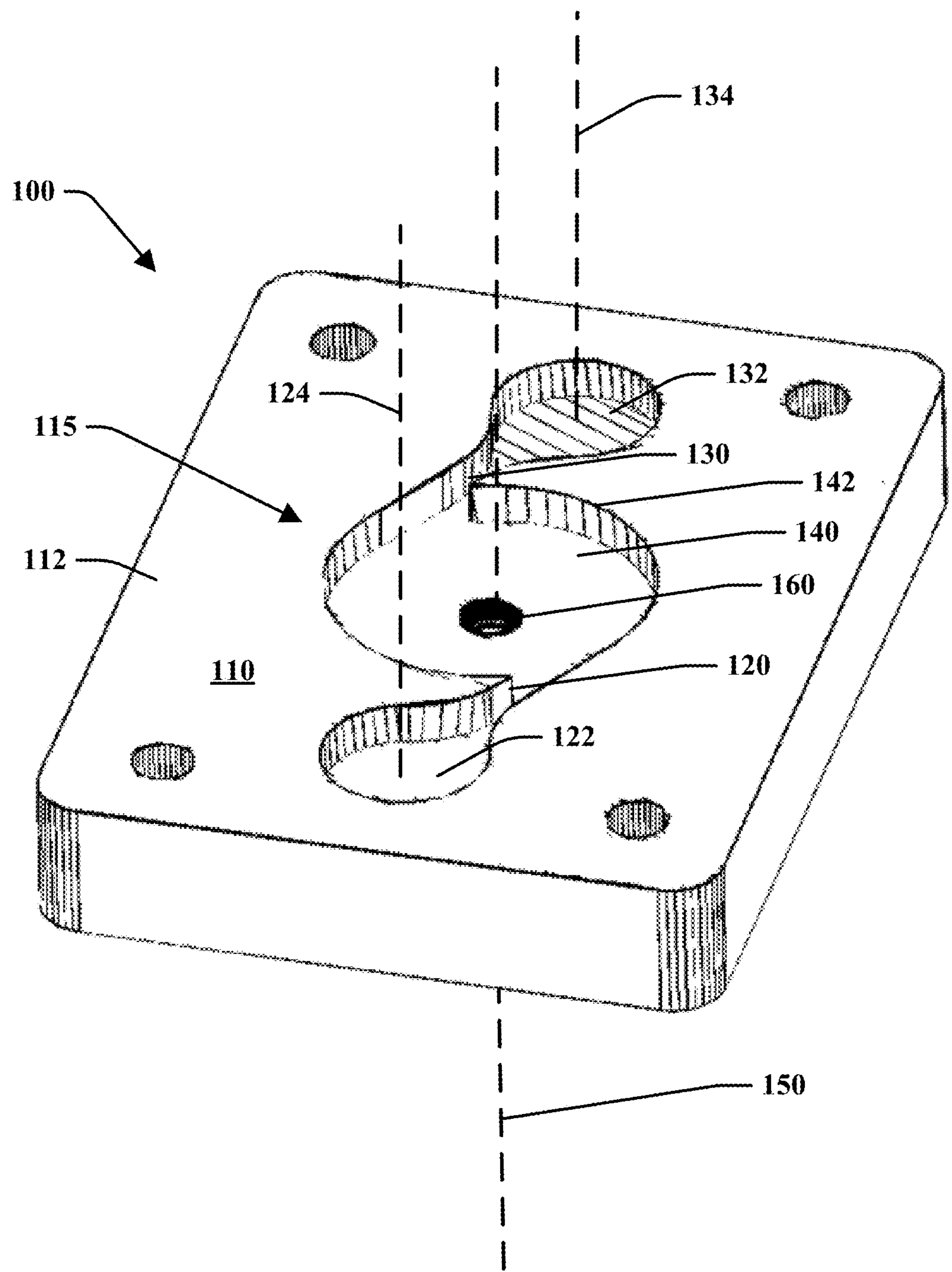
FIG. 2 illustrates a perspective view of an embodiment of a PCV valve assembly in accordance with the present disclosure.

The first and second power nozzles 120, 130 may include sidewalls 126, 136 shaped to slightly converge towards the vortex chamber 140 from a first transfer region 122 and a second transfer region 132, respectively. The fluidic geometry 115 may be shaped wherein the first and second transfer regions 122, 132 may be tangentially aligned with the vortex chamber 140 such that the power nozzles 120, 130 may tangential intersect with a perimeter 142 of the vortex chamber 140. The first and second transfer regions 122, 132 may include a generally bulbous shape and may communicate with lumens that may be positioned along a first transfer region axis 124 and a second transfer region axis 134, respectively as illustrated by FIG. 2.

Figure 3:
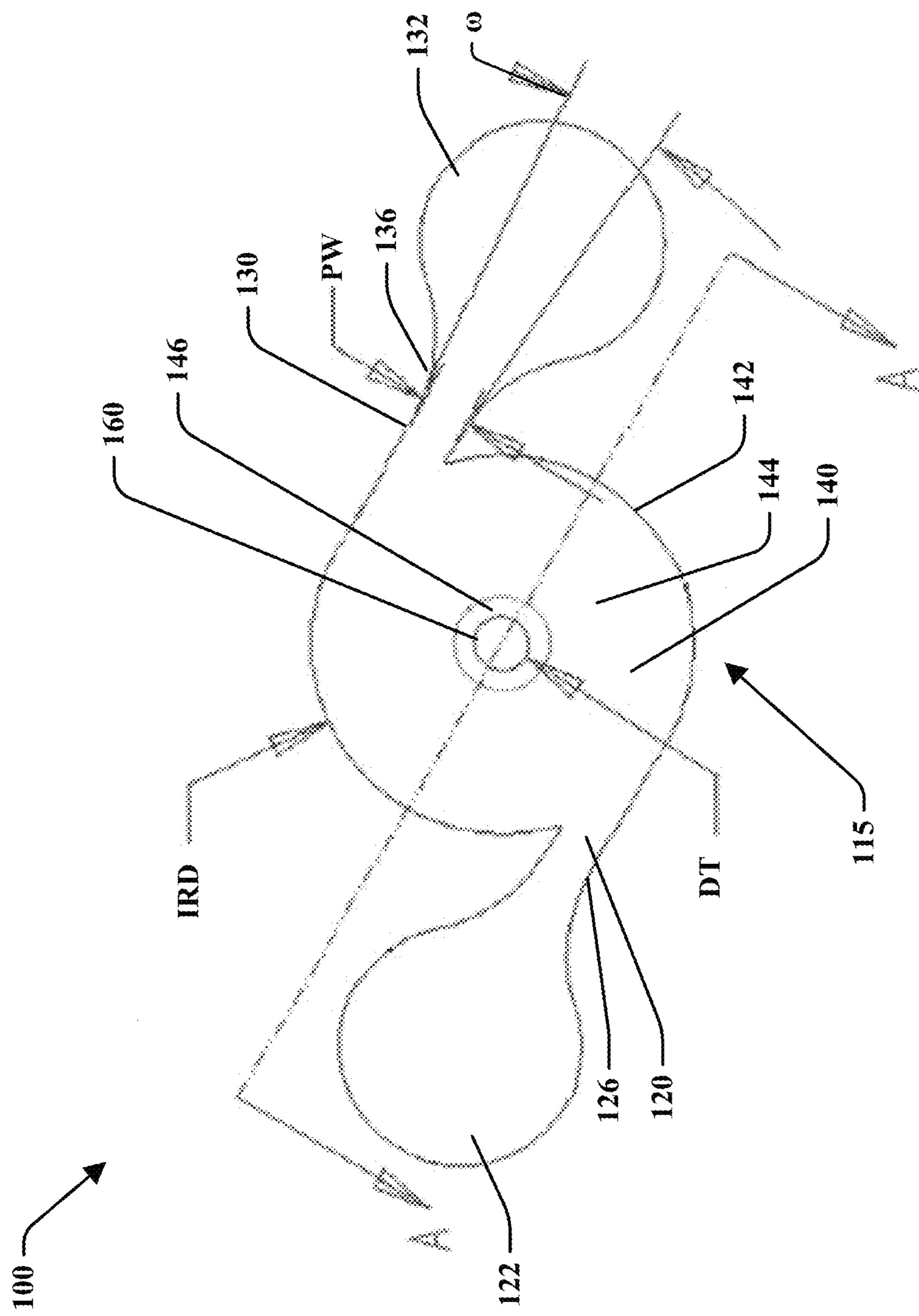
FIG. 3 is a schematic plan view of an embodiment of a fluidic geometry of the PCV valve assembly in accordance with the present disclosure.

The first and second power nozzles 120, 130 may each include a power nozzle width PW of a predetermined dimension as illustrated by FIG. 3. The power nozzle width PW may be configured with other dimensions of the fluidic geometry 115 in order to make the design scalable for various flow rate applications.

Figure 4:
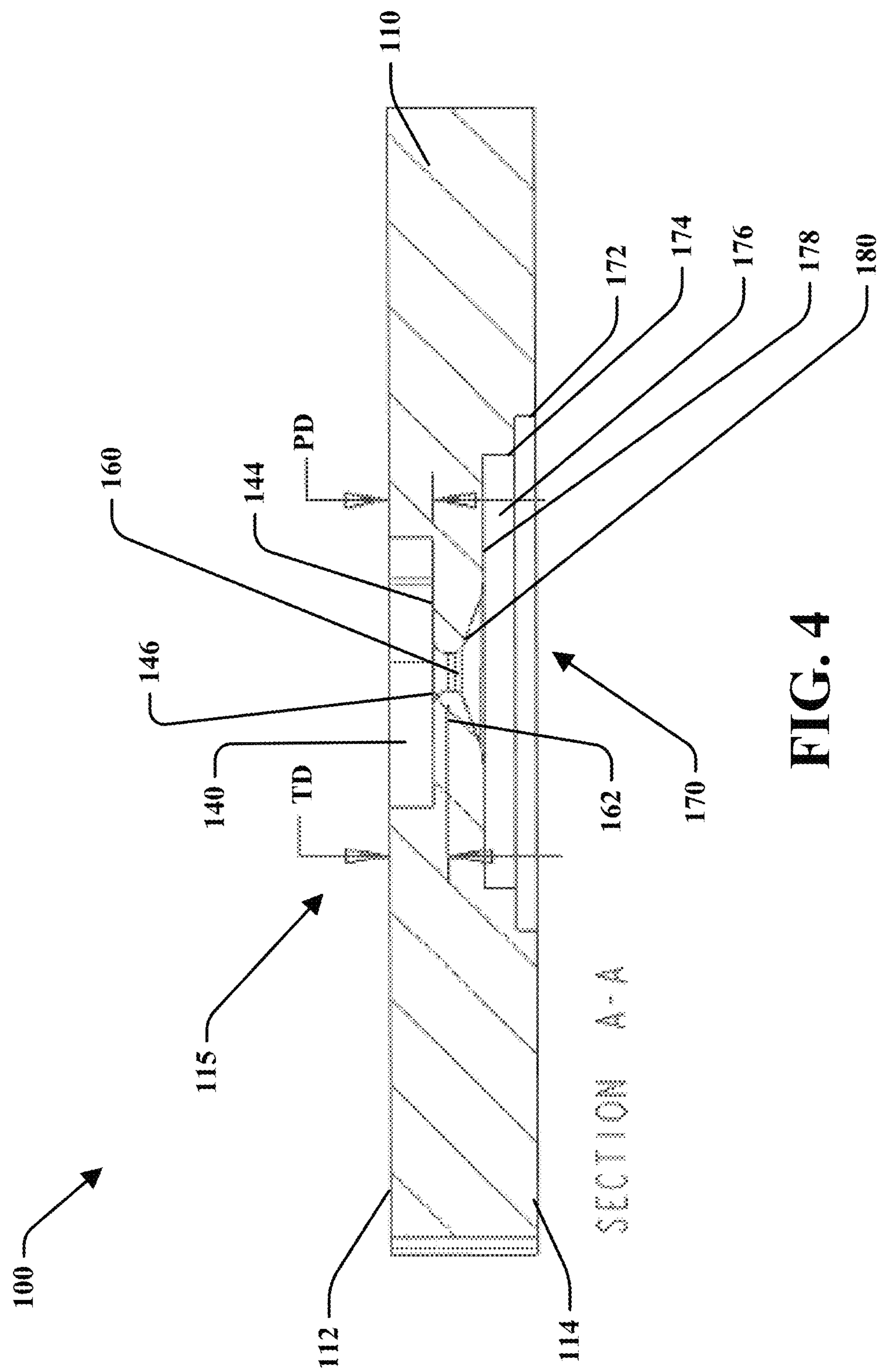
FIG. 4 is a cross-sectional view along line A-A the PCV valve assembly of FIG. 3 in accordance with the present disclosure.

Also, as illustrated by FIG. 4, the fluidic geometry 115 may include a depth as measured from the power nozzles and noted as power nozzle depth PD. This dimension may be the distance from a first side 112 of the body 110 to a floor 144 of the fluidic geometry 115. In one embodiment, the power nozzle depth PD may be generally constant along the floor 144 of the fluidic geometry. Alternatively, this dimension may be varied along the various shaped features and this disclosure is not limited. This dimension may be configured in relationship as the power nozzle width PW to power nozzle depth (PW/PD) ratio. Further, the sidewalls 126, 136 of the first and second power nozzles 120, 130 may include a convergence angle $\omega$ that is a fixed dimension as illustrated by FIG. 3. The convergence angle may be between about 2 degrees and to about 20 degrees. The power nozzle area AP, which is the cross-sectional area of both power nozzles, is a design factor to consider for causing effective swirling when related to the vortex chamber 140 and outlet 160.

As illustrated by FIG. 3, the vortex chamber 140 includes an interaction region diameter IRD. The dimension of the IRD may be related to the power nozzle width PW and may also include a design consideration as the power nozzle width to interaction region diameter (PW/IRD) ratio. The vortex chamber 140 may include a generally circular shape with a throat depth, TD, which is the distance from a top surface 162 of the outlet 160 to the first side 112 of the body 110. The power nozzle depth to throat depth ratio (PD/TD) may be a design consideration that affects the efficiency of the fluidic geometry 115. It may be desirable for the floor 144 to include a smooth transition from within the vortex chamber 140 to the outlet 160 and to the power nozzles 120, 130 in the forward flow condition to improve efficiency. As such, the outlet 160 may include a tapered or rounded portion 146 about the outlet axis 150. Notably, these dimensional ratios may effect the shape of the flow in the various modes described herein and may also be considered to ensure the properly function of the assembly.

Figure 7:
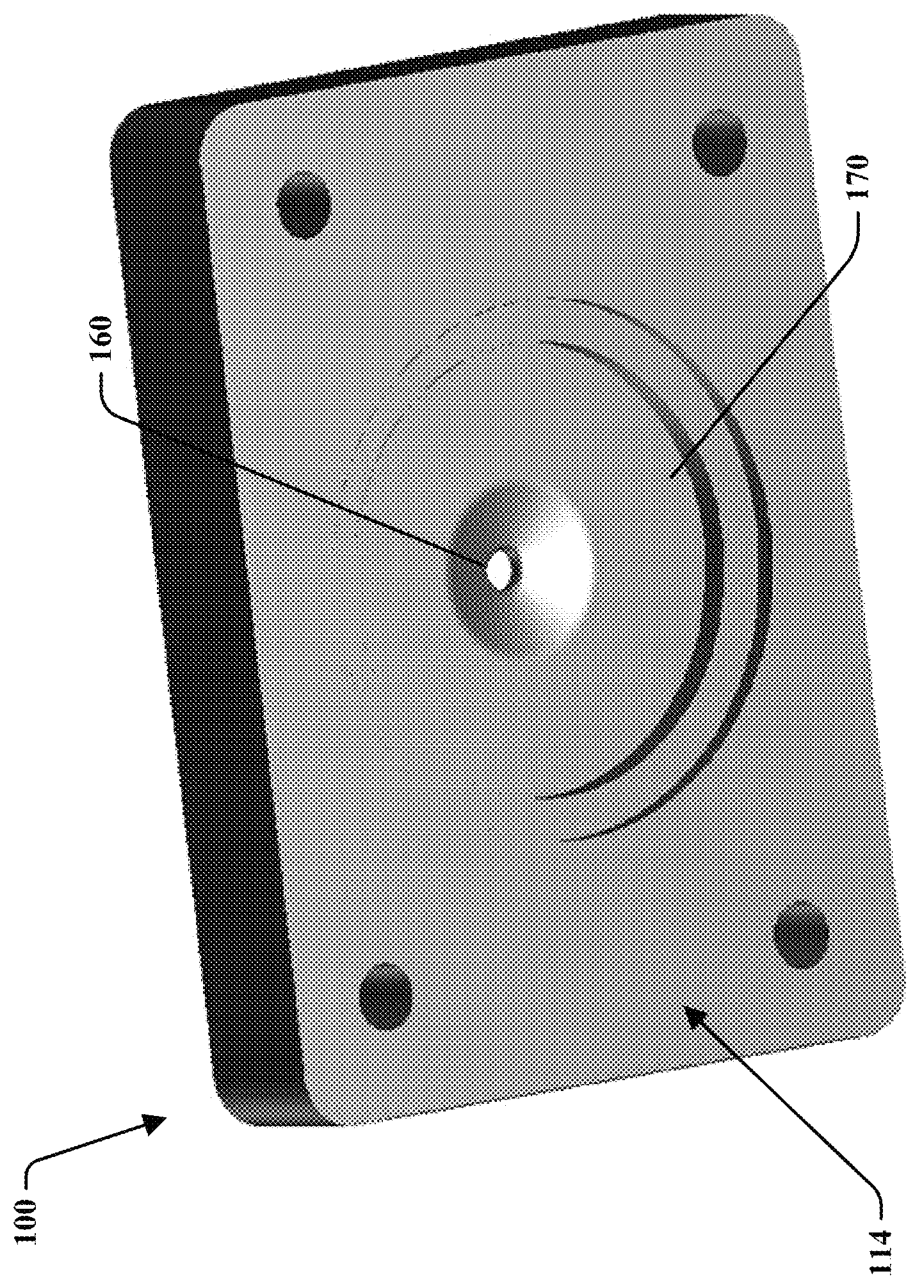
FIG. 7 is a rear perspective view of the PCV valve assembly in accordance with the present disclosure.
Figures 8, 9:
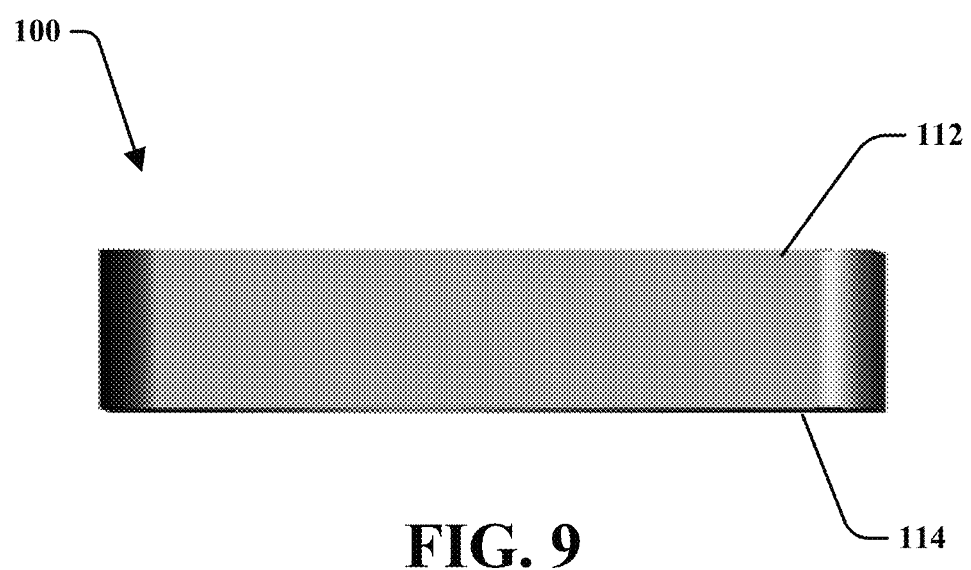
FIG. 8 is a side view of the PCV valve assembly of FIG. 7 in accordance with the present disclosure.
FIG. 9 is an end view of the PCV valve assembly of FIG. 7 in accordance with the present disclosure.

The outlet 160 of the vortex chamber may assist to control the flow rate of the forward flow. The throat area AT includes a throat diameter DT (FIG. 3) wherein these dimensions may be considered in relationship with the other identified dimensions for efficient control of the forward flow while the reverse flow may be controlled by generating a swirl flow in the vortex chamber 140. The relationship of the power nozzle area to the throat area (AP/AT) may be modified and optimized for efficiently generating the swirl in the vortex chamber 140. If AP/AT is too low, then there may be too much back pressure which may reduce the efficiency of the swirl flow. However, if AP/AT is too high, then the flow path may not be restrictive enough to generate the swirl flow. The outlet 160 may communicate fluid with an outlet region 170 of the body 110 which is illustrated along a second side 114 opposite the first side 112 as illustrated by FIGS. 4 and 7.

The outlet region 170 may be defined within the second side 114 of the housing and include an outer perimeter 172 having a generally circular shape. However, the outer perimeter 172 as well as the shape of the outlet region 170 may also be configured in various shapes as required to maintain communication with the fluidic system 200 and the outlet 160. The outlet region 170 may include a first shoulder 174 positioned within the outer perimeter and at a depth that is spaced from the second side 114. The first shoulder 174 may be an annular surface that defines an inner outlet region 176. The inner outlet region 176 may be positioned within the outer perimeter at a depth that is further spaced from the second side 114 than the first shoulder 174. An outlet floor 178 may be positioned within the inner outlet region 176. A tapered surface 180 may extend from the outlet floor 178 to the outlet 160 wherein the tapered surface 180 may be generally concave or conical about the outlet axis 150 and be in communication with the outlet 160.

Figure 5:
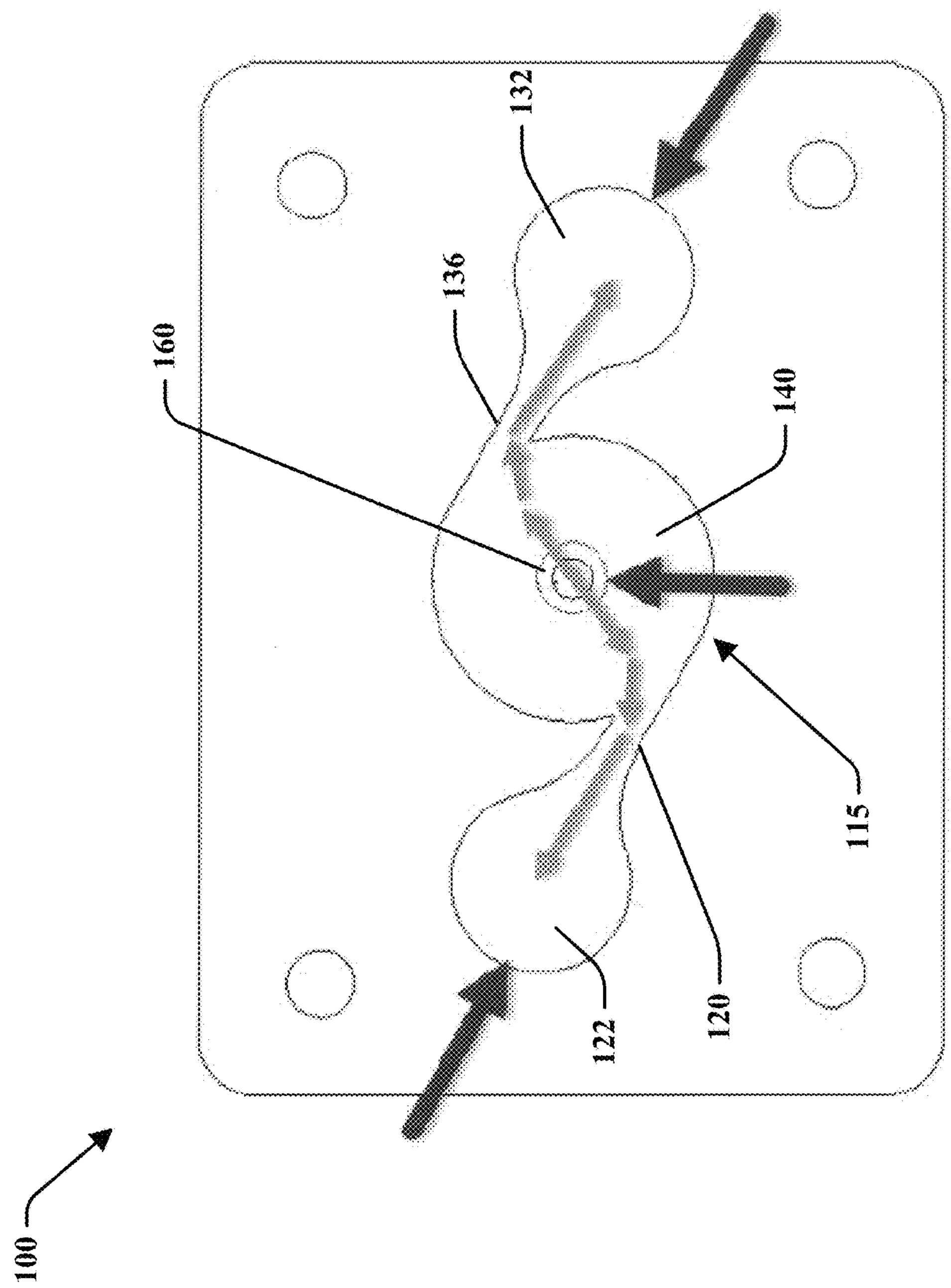
FIG. 5 is a front plan view of an embodiment of the PCV valve assembly with fluid flow in a first high flow forward mode in accordance with the present disclosure.
Figure 6:
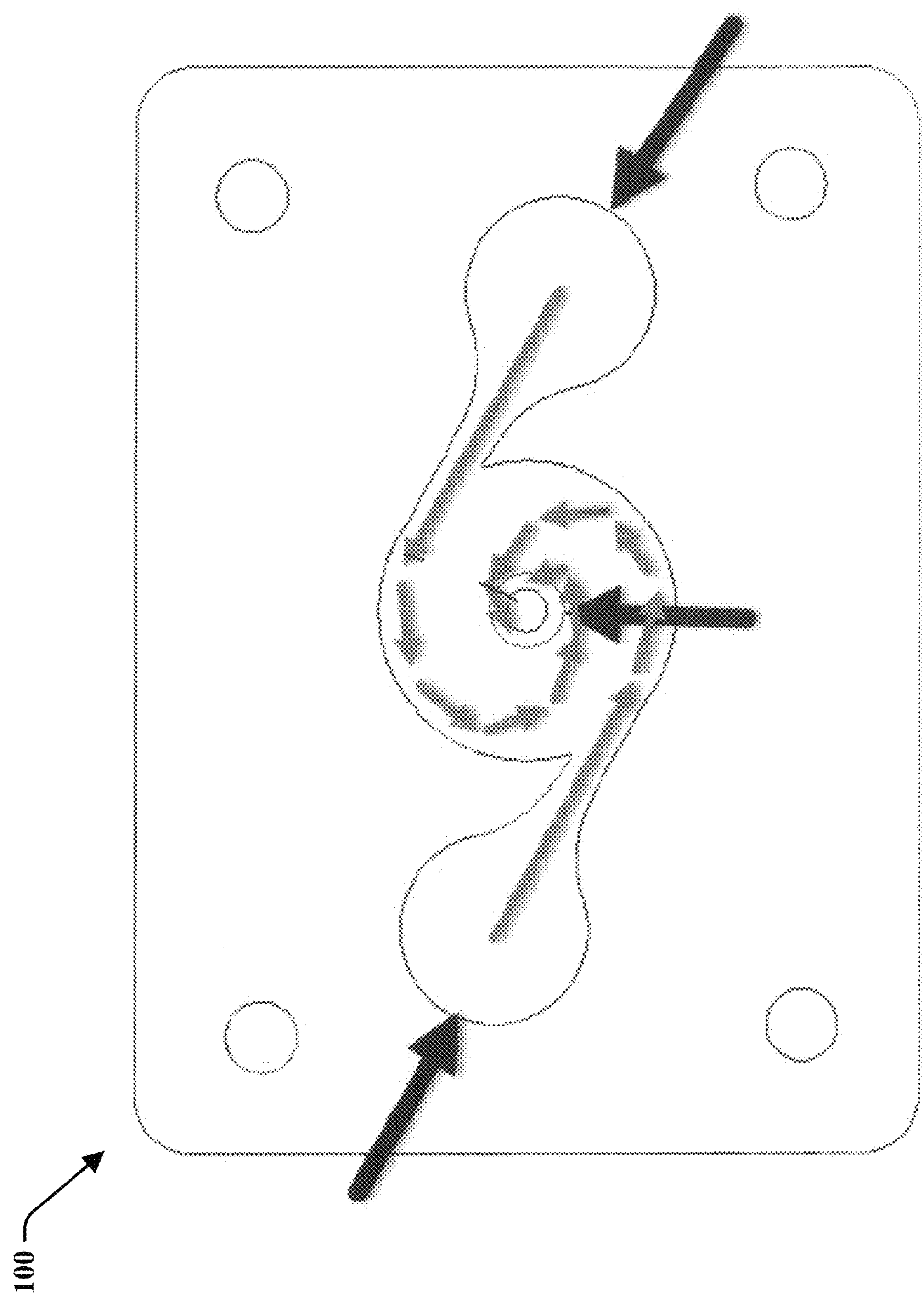
FIG. 6 is a front plan view of an embodiment of the PCV valve assembly with fluid flow in second low flow reverse mode in accordance with the present disclosure.

The bi-directional PCV valve assembly 100 may function differently in distinct states corresponding to the forward flow state (as illustrated in FIG. 5) and reverse flow state (as illustrated in FIG. 6). In the first or "forward flow" state (illustrated in FIGS. 5 and 10), the flow enters the outlet 160 (now an inlet) from the second side 114 and is directed from a central outlet lumen 160 to first and second opposing tangential power nozzles 120, 130. As shown by FIG. 5, the initial flow is represented by an arrow directed towards the outlet 160 which is directed through lumen 220B. Once the flow enters the vortex chamber 140, the flow translates radially towards the respective power nozzles 120, 130 oppositely positioned about the perimeter of the vortex chamber 140. The flow enters the respective first and second transfer regions 122, 132 and then to corresponding lumens (now outlets) 220A.

In the second or "reverse flow" state (illustrated in FIGS. 6 and 11), the flow is communicated through at least one lumen 220A which may branch between the first and second transfer regions 122, 132 (now inlets). The flow may exit the first and second transfer regions 122, 132 through the respective power nozzles 120, 130 and enter the vortex chamber 140. The flow may follow a nearly circular, spiral path from first and second opposing tangential power nozzles 120, 130 and the corresponding transfer regions lumens (now inlets) spiraling within the vortex chamber 140 and then exhausting from the central outlet 160 (now as an outlet) and lumen 220B.

In the bi-directional fluidic-equipped PCV valve flow controller and system of the present disclosure, there may be two modes of operation, (a) a boosted condition, with forward flow (FIG. 10) and (b) non-boosted condition, with reverse flow (FIG. 11), as dictated during the operation of the engine. The first is a radial mode or high flow mode as described and illustrated by FIG. 5. The second is a tangential mode or low flow mode as described and illustrated by FIG. 6. At low or non-boosted pressures, the bidirectional fluidic equipped PCV valve flow controller 100 has been tuned to operate in swirling spiral or tangential mode producing low flow rates (because of higher flow resistance). As boost increases the fluidic equipped bi-directional PCV valve flow assembly 100 automatically switches modes to modify the rate of flow therein without moving parts. Notably, the threshold level of pressure and flow rate in which the control of the flow switches may be adjusted by modifying various geometric dimensions of the fluidic geometry 115.

Figure 10:
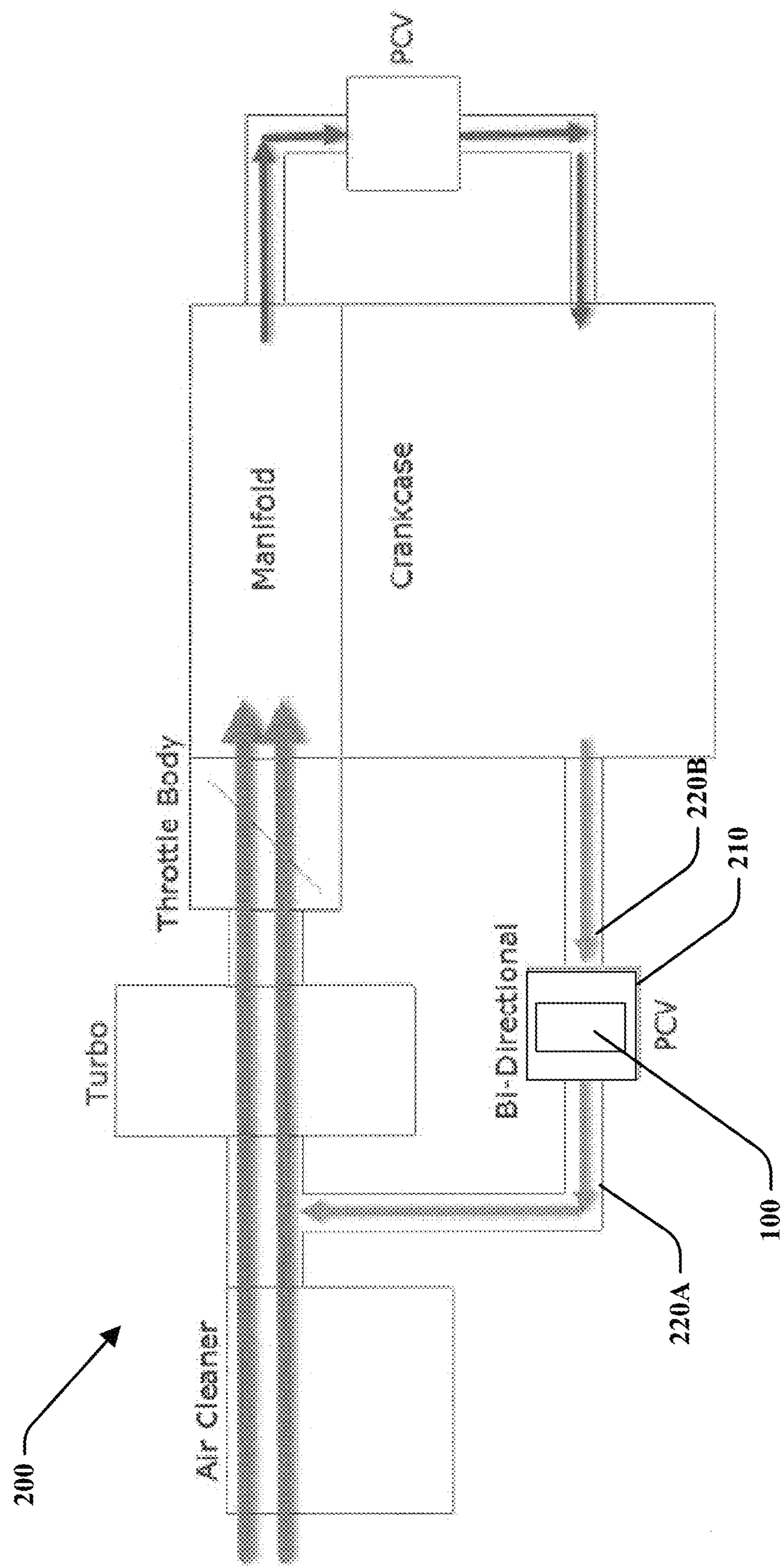
FIG. 10 is a schematic illustration of a PCV system of an engine in a boosted condition with forward flow direction over the PCV valve assembly in accordance with the present disclosure.
Figure 11:
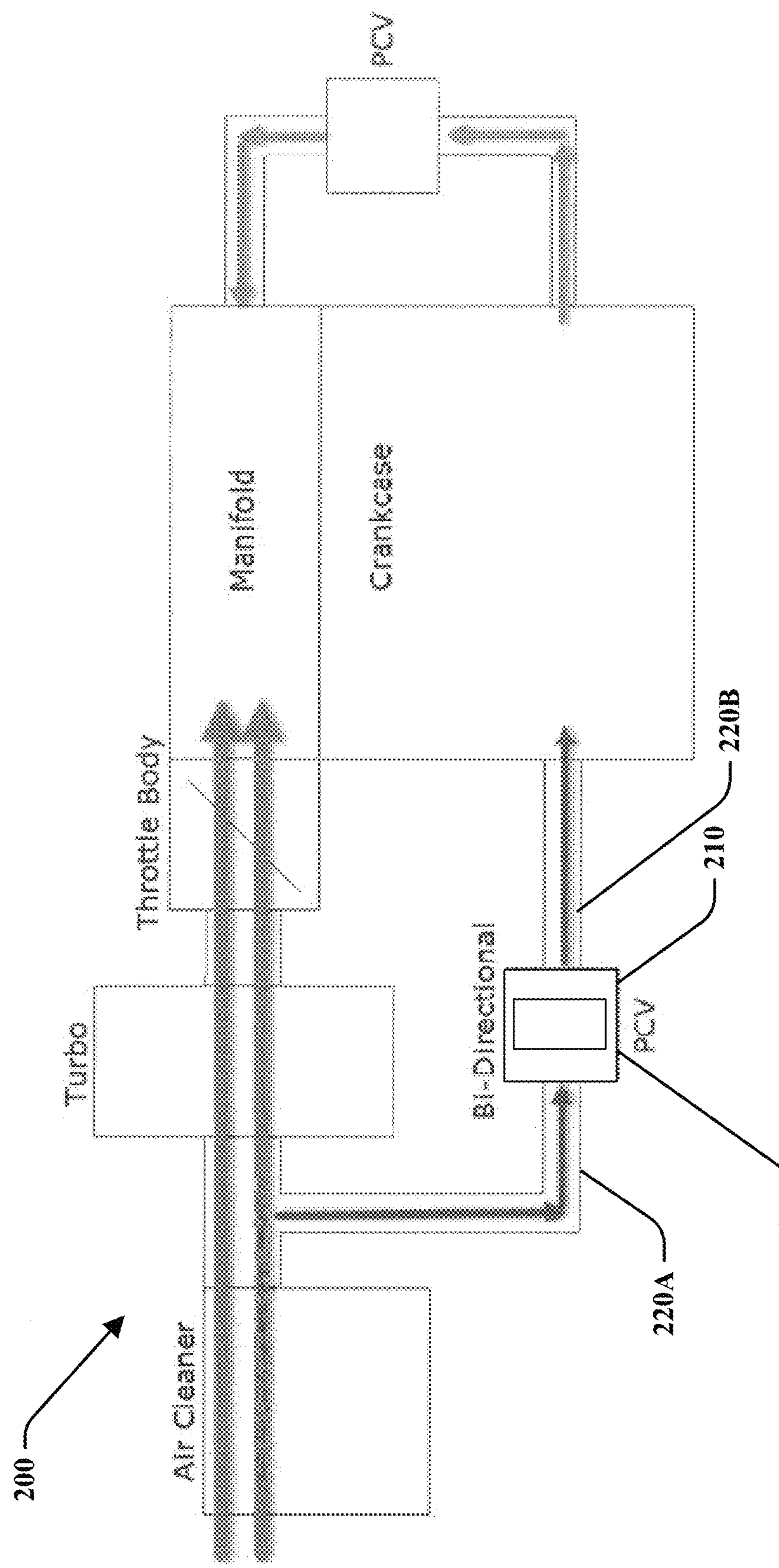
FIG. 11 is a schematic illustration of a PCV system of an engine in a non-boosted condition with reverse flow direction over the PCV valve assembly in accordance with the present disclosure.

As illustrated by FIGS. 10 and 11, provided is a PCV system 200 that includes a bi-directional PCV valve assembly 100 with fluid communication with tube(s) or lumens 220 from upstream of the throttle body (or turbo inlet) to the crankcase and, as noted above, includes no moving parts. Bi-directional PCV valve assembly 100 may use the fluidic geometry 115 as illustrated by FIGS. 2-9 which includes illustrated passages, channels or ports dimensioned to reliably and precisely produce different flow rates in the forward flow direction (as illustrated by FIG. 5) and the reverse flow direction (as illustrated by FIG. 6), where flow rates in the two opposing flow directions are precisely controlled to provide a selected (e.g., one to three) ratio, meaning flow in the forward direction may be three times that of the flow in the reverse direction.

The body 110 of the PCV assembly 100 may be configured to align within a housing 210 having lumens 220A, 220B extending in communication with the fluid system 200 such as schematically illustrated by FIGS. 10 and 11. Also, the body 110 may be positioned within the housing 210 wherein the fluidic geometry 115 described as being defined within the body 110 may abut against inner surfaces of the housing to establish that the fluid flow therein behaves in a desired manner due to the fluidic geometry 115 as described and be in communication with the lumens 220 of the fluid system 200.

The system and method of the present invention may be used with turbo charged engines and may provide an improved PCV system 200. The system includes the fluidic bi-directional PCV valve assembly 100 to reliably provide a high flow rate in the forward flow state, and a low flow rate in the opposite, reverse flow state. The apparatus and method of the present invention omits any need for a flapper valve, and allows for the utilization of a relatively larger outlet orifice, than in prior art valves, that may reduce the chance of clogging. Swirling flow in the reverse direction (FIG. 6)

may increase the pressure drop significantly and reduce the flow rate to about a third of the flow rate of the forward flow. The system of the present invention focuses on producing a strong swirling flow (vortex) in the reverse direction and an efficient (low pressure drop) flow in the forward direction. The fluidic equipped bi-directional PCV valve of the present disclosure provides superior performance and never sticks open or closed or wears out, having no moving parts to wear out or fail.

The system 200 and method of the present disclosure provide enhanced control over the working fluid of a PCV system (i.e., a gas/liquid with entrained atomized oil/moisture). When that working fluid is passed through an obstacle (like a traditional PCV valve assembly) the atomized oil and any dissolved impurities in that oil may collect on the surfaces and eventually turn to sludge that will prevent the moving parts (e.g., a flapper valve) from functioning, which may eventually clog an orifice. For an original equipment or vehicle manufacturer, this failure mode is understood to be a problem leading to increased warranty repairs and costs. An advantage of the system and method of the present disclosure includes the simplicity of manufacture and lack of moving parts which may provide reduced expense and warranty repairs. In addition to omitting moving parts, the PCV valve assembly 100 of the present disclosure includes a fixed geometry which eliminates partially opened/closed passages that are susceptible to getting stuck or clogging.

The assembly may operate and automatically switch between the high forward flow mode and the low reverse flow mode. The threshold for the mode-switch may be tunable for each engine or application. In one embodiment, the functionality between the modes may include the high flow mode may be about three times the rate of the low flow mode (see, e.g., plotted performance data of FIG. 12A). In this embodiment, the transition between high forward mode and low reverse mode occurs at about 0 (kpa) pressure wherein high forward mode is illustrated to occur from about −40 (kpa) to about 0 (kpa) and low reverse mode is illustrated to occur from about 0 (kpa) to about 30 (kpa).

Figures 12A, 12B:
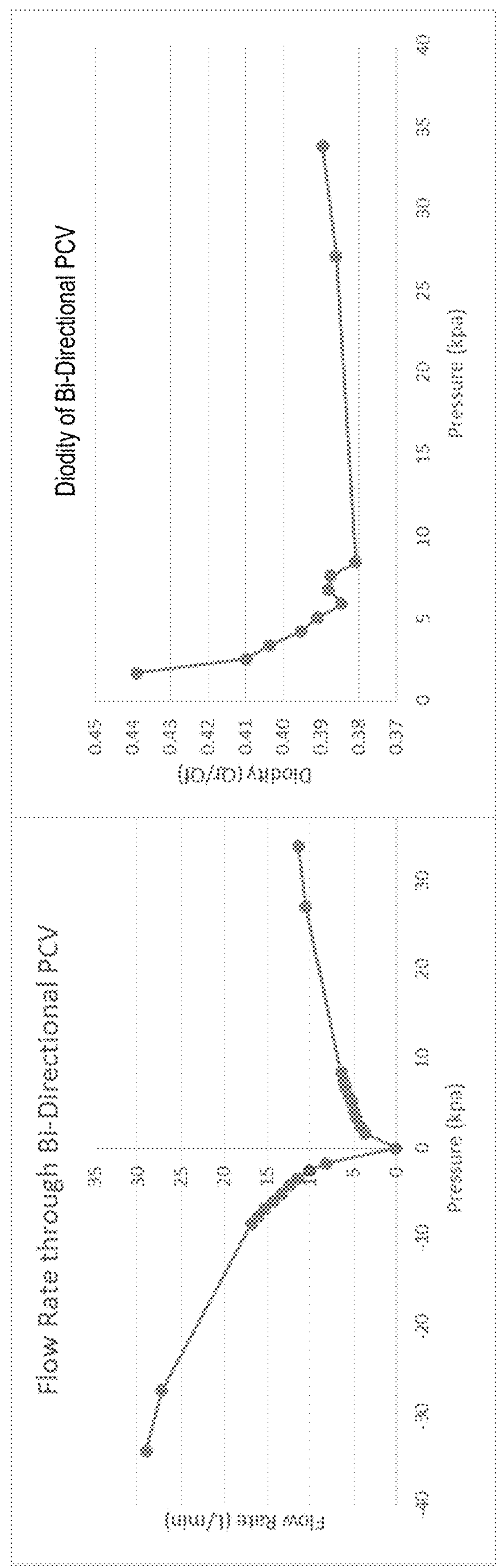
FIG. 12A is a graph illustrating flow rate vs. pressure results of the PCV valve assembly as it experiences both forward flow and reverse flow therethrough.
FIG. 12B is a graph illustrating diodity vs. pressure results of the PCV valve assembly of the present disclosure.

Further, the functionality of the PCV assembly may be illustrated by diodity vs. pressure as illustrated by FIG. 12B. Diodity is the ratio of the reverse flow rate relative to the forward flow rate wherein DIODITY=$Q_R/Q_F$. This graph illustrates that the PCV value assembly exhibits an average diodity of 0.4 when the pressure is less than about 35 (kpa). Notably, this measured functionality may exist when the body 110 of the PCV valve assembly includes a footprint that is about or less than about 1 inch by 1 inch in size.

Although the embodiments of the present disclosure have been illustrated in the accompanying drawings and described in the foregoing detailed description, it is to be understood that the present disclosure is not to be limited to just the embodiments disclosed, but that the present disclosure described herein is capable of numerous rearrangements, modifications and substitutions without departing from the scope of the claims hereafter. The claims as follows are intended to include all modifications and alterations insofar as they come within the scope of the claims or the equivalent thereof.

Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bi-directional PCV valve assembly comprising:
a body defining a fluidic geometry comprising:
a first transfer chamber in communication with a first power nozzle;
a second transfer chamber in communication with a second power nozzle;
a vortex chamber having a perimeter wherein the first and second power nozzles intersect along the perimeter of the vortex chamber, said vortex chamber in communication with an outlet;
wherein the assembly is configured to switch between a low flow mode and a high flow mode based on the direction of fluid or gas flow through the fluidic geometry.

2. The PCV valve assembly of claim 1, wherein in high flow mode, fluid or gas enters the outlet and traverses through the vortex chamber towards the first transfer chamber and second transfer chamber such that the fluid or gas is in a boosted condition.

3. The PCV valve assembly of claim 1, wherein the assembly is tunable to automatically switch between the low flow mode and the high flow mode based on vacuum pressure at the outlet.

4. The PCV valve assembly of claim 1, wherein in low flow mode, fluid or gas enters the first transfer chamber and traverses through the first power nozzle into the vortex chamber, fluid or gas enters the second transfer chamber and traverses through the second power nozzle into the vortex chamber, wherein fluid or gas creates a swirl within the vortex chamber and flow towards the outlet.

5. The PCV valve assembly of claim 4, wherein said flow traverses through the first and second power nozzles and aligns along an outer wall of the vortex chamber before forming a swirl flow within the vortex chamber.

6. The PCV valve assembly of claim 1, wherein said first power nozzle includes a shape that converges from the first transfer region towards the vortex chamber.

7. The PCV valve assembly of claim 1, wherein said second power nozzle includes a shape that converges from the second transfer region towards the vortex chamber.

8. The PCV valve assembly of claim 1, wherein said first transfer chamber and the second transfer chamber have a bulbous shape.

9. The PCV valve assembly of claim 1, wherein said body includes a first side and an opposite second side wherein the vortex chamber is formed in the first side of the body and an outlet region is formed in the second side of the body.

10. The PCV valve assembly of claim 1, wherein the high flow mode includes a flow rate that is about three times the flow rate of the low flow mode.

11. A fluidic-equipped bi-directional PCV valve flow assembly comprising:
a housing defining a cavity in communication with a plurality of lumens;
a body positioned within said cavity, said body defining a fluidic geometry comprising:
a first transfer chamber in communication with a first power nozzle;
a second transfer chamber in communication with a second power nozzle;
a vortex chamber having a perimeter wherein the first and second power nozzles intersect along the perimeter of the vortex chamber, said vortex chamber in communication with an outlet;

wherein the assembly is configured to switch between a low flow mode and a high flow mode based on the direction of fluid or gas flow through the fluidic geometry.

12. The fluidic-equipped bi-directional PCV valve flow controller of claim 11, wherein in high flow mode, fluid or gas enters the outlet and traverses through the vortex chamber towards the first transfer chamber and second transfer chamber such that the fluid or gas is in a boosted condition.

13. The fluidic-equipped bi-directional PCV valve flow controller of claim 11, wherein the assembly is tunable to automatically switch between the low flow mode and the high flow mode based on vacuum pressure at the outlet.

14. The fluidic-equipped bi-directional PCV valve flow controller of claim 11, wherein in low flow mode, fluid or gas enters the first transfer chamber and traverses through the first power nozzle into the vortex chamber, fluid or gas enters the second transfer chamber and traverses through the second power nozzle into the vortex chamber, wherein fluid or gas creates a swirl within the vortex chamber and flow towards the outlet.

15. The fluidic-equipped bi-directional PCV valve flow controller of claim 11, wherein said first power nozzle includes a shape that converges from the first transfer region towards the vortex chamber and said second power nozzle includes a shape that converges from the second transfer region towards the vortex chamber.

16. The fluidic-equipped bi-directional PCV valve flow controller of claim 11, wherein said first transfer chamber and the second transfer chamber have a bulbous shape.

17. The fluidic-equipped bi-directional PCV valve flow controller of claim 11, wherein said body includes a first side and an opposite second side wherein the vortex chamber is formed in the first side of the body and an outlet region is formed in the second side of the body.

18. The fluidic-equipped bi-directional PCV valve flow controller of claim 11, wherein the high flow mode includes a flow rate that is about three times the flow rate of the low flow mode.

19. A method for providing enhanced PCV performance in a system comprising the method steps of:

(a) providing a PCV valve assembly with an inlet configured for fluid communication with an engine's crankcase interior volume and an outlet configured for fluid communication with an air intake tube;

(b) providing, in that PCV valve assembly, a housing defining a cavity, a body positioned within said cavity, said body defining a fluidic geometry comprising:

a first transfer chamber in communication with a first power nozzle;

a second transfer chamber in communication with a second power nozzle;

a vortex chamber having a perimeter wherein the first and second power nozzles intersect along the perimeter of the vortex chamber, said vortex chamber in communication with an outlet; and (c) introducing a flow of fluid or gas at the inlet to traverse through said PCV valve assembly to said outlet.

20. The method of claim 19, further comprising:

modifying a direction of flow at the inlet; and switching characteristics of the flow of fluid or gas between a high flow mode and a low flow mode.

* * * * *